(12) United States Patent
Masamura

(10) Patent No.: US 11,109,034 B2
(45) Date of Patent: Aug. 31, 2021

(54) IMAGE PROCESSING APPARATUS FOR ALIGNMENT OF IMAGES, CONTROL METHOD FOR IMAGE PROCESSING APPARATUS, AND STORAGE MEDIUM

(71) Applicant: CANON KABUSHIKI KAISHA, Tokyo (JP)

(72) Inventor: Takuya Masamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/037,888

(22) Filed: Jul. 17, 2018

(65) Prior Publication Data
US 2019/0028709 A1    Jan. 24, 2019

(30) Foreign Application Priority Data
Jul. 20, 2017 (JP) .............................. JP2017-141099

(51) Int. Cl.
| | |
|---|---|
| *H04N 19/139* | (2014.01) |
| *H04N 5/232* | (2006.01) |
| *H04N 5/341* | (2011.01) |
| *H04N 5/235* | (2006.01) |
| *H04N 5/225* | (2006.01) |
| *G06T 5/00* | (2006.01) |
| *G06T 7/30* | (2017.01) |
| *G06T 3/40* | (2006.01) |

(52) U.S. Cl.
CPC ......... *H04N 19/139* (2014.11); *G06T 3/4038* (2013.01); *G06T 5/006* (2013.01); *G06T 7/30* (2017.01); *H04N 5/2256* (2013.01); *H04N 5/2353* (2013.01); *H04N 5/23229* (2013.01); *H04N 5/23238* (2013.01); *H04N 5/23254* (2013.01); *H04N 5/23258* (2013.01); *H04N 5/341* (2013.01); *G06T 2207/20212* (2013.01)

(58) Field of Classification Search
CPC ............. H04N 19/139; H04N 5/23258; H04N 5/23238; H04N 5/23254; H04N 5/23229; H04N 5/341; H04N 5/2353; H04N 5/2256; G06T 7/30; G06T 3/4038; G06T 5/006; G06T 2207/20212
See application file for complete search history.

(56) References Cited

U.S. PATENT DOCUMENTS

| | | | |
|---|---|---|---|
| 9,247,129 B1 * | 1/2016 | Gray | .................... G06T 7/11 |
| 10,475,159 B2 * | 11/2019 | Wakamiya | ............ G06T 3/4007 |
| 2008/0232715 A1 * | 9/2008 | Miyakawa | ............... G06T 7/33 |
| | | | 382/284 |

(Continued)

FOREIGN PATENT DOCUMENTS

| | | |
|---|---|---|
| JP | 2010-050521 A | 3/2010 |
| JP | 2011-082919 A | 4/2011 |

(Continued)

*Primary Examiner* — Michael J Hess
(74) *Attorney, Agent, or Firm* — Canon U.S.A., Inc. I.P. Division

(57) ABSTRACT

A system control unit sets at least one of a non-overlapped area in which an nth image and an (n+1)st image do not overlap and a low contrast area of the (n+1)st image as an in valid area that is not used for misalignment detection of the (n+1)st image. Then, the system control unit sets alignment small blocks for a motion vector search in only an area excluding the invalid area in the overlapped area in which two combining target images overlap.

12 Claims, 8 Drawing Sheets

(56) References Cited

U.S. PATENT DOCUMENTS

| | | | |
|---|---|---|---|
| 2012/0275712 A1* | 11/2012 | Inaba | G06K 9/6211 |
| | | | 382/201 |
| 2013/0293682 A1* | 11/2013 | Zouda | G03B 17/20 |
| | | | 348/46 |
| 2014/0028792 A1* | 1/2014 | Abe | H04N 5/23238 |
| | | | 348/37 |
| 2015/0138399 A1* | 5/2015 | Ma | G06K 9/00624 |
| | | | 348/239 |
| 2016/0210731 A1* | 7/2016 | Hamada | G06T 5/50 |
| 2017/0180641 A1* | 6/2017 | Yamada | G06T 7/38 |
| 2017/0228904 A1* | 8/2017 | Bushmitch | G06T 5/50 |
| 2017/0280055 A1* | 9/2017 | Kaida | H04N 5/23251 |
| 2017/0347044 A1* | 11/2017 | Douady-Pleven | H04N 5/247 |
| 2018/0213217 A1* | 7/2018 | Yu | H04N 17/002 |
| 2018/0227484 A1* | 8/2018 | Hung | H04N 5/23238 |
| 2018/0374192 A1* | 12/2018 | Kunkel | G06T 15/205 |
| 2019/0297283 A1* | 9/2019 | Douady | H04N 5/23238 |
| 2019/0307632 A1* | 10/2019 | Yashiro | G09B 21/00 |

FOREIGN PATENT DOCUMENTS

| | | | |
|---|---|---|---|
| JP | 2013-030874 A | 2/2013 | |
| JP | 2013-046270 A | 3/2013 | |

\* cited by examiner

PANNING DIRECTION

PANNING DIRECTION

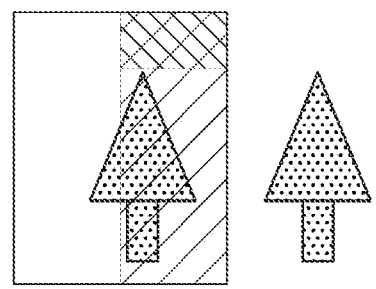
FIG. 7A
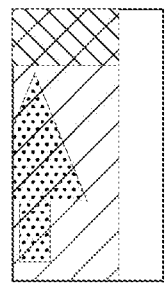
FIG. 7B
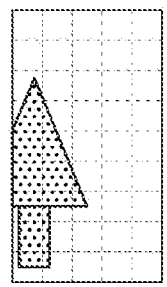
FIG. 7C
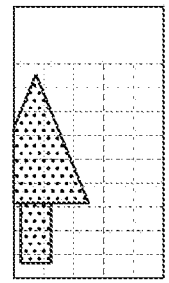

IMAGE PROCESSING APPARATUS FOR ALIGNMENT OF IMAGES, CONTROL METHOD FOR IMAGE PROCESSING APPARATUS, AND STORAGE MEDIUM

BACKGROUND OF THE INVENTION

Field of the Invention

The present invention relates to an image processing apparatus, a control method for the image processing apparatus, and a storage medium.

Description of the Related Art

Japanese Patent Application Laid-Open No. 2013-46270 discusses a method for sequentially capturing still images while panning an image capturing apparatus to generate a wide-angle image (hereinafter referred to as "a panoramic image") from the plurality of acquired still images. In generation of a panoramic image, if the detection accuracy of image misalignment is low, a plurality of images are combined in such a manner that a joint of the plurality of images becomes unnatural. Accordingly, when a panoramic image is generated, the detection accuracy of misalignment of a plurality of images to be combined is important. A technique for detecting such misalignment is discussed in Japanese Patent Application Laid-Open No. 2013-30874. Japanese Patent Application Laid-Open No. 2013-30874 discusses a method by which relative positions between each of two image slits of combining targets and an alignment slit is calculated to detect misalignment of the two image slits in a horizontal direction.

However, since the method discussed in Japanese Patent Application Laid-Open No. 2013-30874 needs to perform misalignment detection twice to combine the two image slits, detection of misalignment consumes time. Moreover, an image different from the combining target images is necessary to combine the combining target images. Moreover, in a case where an area in which the image slit and the alignment slit overlap each other is small, the detection accuracy of misalignment is degraded.

SUMMARY OF THE INVENTION

Embodiments of the present invention are directed to improving detection accuracy of misalignment of combining target images without excess processing load.

According to embodiments of the present invention, an image processing apparatus includes at least one memory storing instructions; and at least one processor connected to the at least one memory and configured to execute the instructions, which when executed by the at least one processor, cause the image processing apparatus to: set a misalignment detection area in a second captured image that is to be combined with a first captured image to detect misalignment between the first captured image and the second captured image, and align the first captured image and the second captured image by increasing density of a plurality of blocks which is for detection of misalignment and is included in the detection area, reducing the misalignment detection area, and using information of the reduced misalignment detection area.

Further features of the present invention will become apparent from the following description of exemplary embodiments with reference to the attached drawings.

BRIEF DESCRIPTION OF THE DRAWINGS

FIGS. 7A to 7C are diagrams each illustrating a second example of a method for detecting misalignment in a panoramic image.

DESCRIPTION OF THE EMBODIMENTS

Exemplary embodiments are hereinafter described with reference to the drawings. Each of the exemplary embodiments is described using an example in which an image processing apparatus is included in a digital camera. However, the image processing apparatus in each of the exemplary embodiments described below can be applied to any apparatus as long as the apparatus is capable of generating a panoramic image. For example, the image processing apparatus of each of the exemplary embodiments can be applied to various mobile equipment (e.g., a smart phone and a tablet terminal), an industrial camera, an in-vehicle camera, and a medical camera.

A first exemplary embodiment will be described below.

Figure 1:
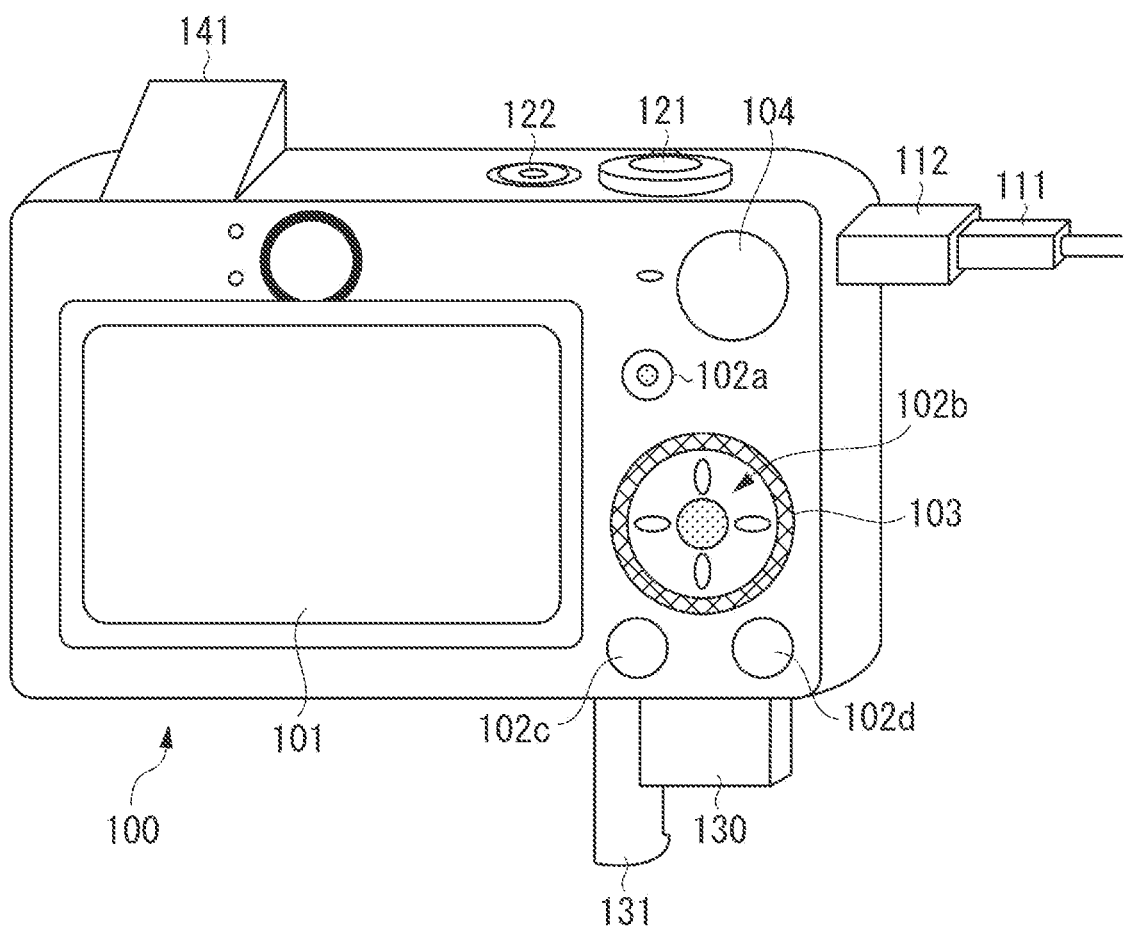
FIG. 1 is a diagram illustrating an external configuration of a digital camera.

FIG. 1 illustrates an example of an external configuration of a digital camera 100. FIG. 1 is a perspective view of the back of the digital camera 100.

In FIG. 1, a display unit 101 and operation units 102a through 102d are arranged on the back of the digital camera 100. The display unit 101 displays an image and various information. The operation units 102a through 102d include operation members, such as various switches and buttons to receive various operations from a user.

Moreover, on the back of the digital camera 100, a controller wheel 103 and a mode selection switch 104 are arranged. The controller wheel 103 is a rotatable member. The controller wheel 103 is used when a selection item is designated on a screen displayed on the display unit 101. The mode selection switch 104 is used to switch a mode, such as an image capturing mode. For example, the image capturing mode includes a still-image capturing mode, a moving-image capturing mode, and a playback mode. The still-image capturing mode includes a panoramic image combining mode in addition to a mode such as an automatic image capturing mode. The panoramic image combining mode is a mode for generating a panoramic image by capturing images during panning.

On the top surface of the digital camera 100, a shutter button 121, a power switch 122, and a flash unit 141 are arranged. The shutter button 121 is used to issue an image capturing instruction. The power switch 122 is used to switch the power of the digital camera 100 between on and off. The flash unit 141 irradiates a subject with a flash.

The digital camera 100 can be connected to an external device via a connection cable 111 and a connector 112, so that image data (e.g., still image data and moving image data) can be output to the external device. On the bottom surface of the digital camera 100, a storage medium slot (not illustrated) is arranged. The storage medium slot can be opened and closed by a lid 131. A storage medium 130 such as a memory card can be inserted into and removed from the storage medium slot.

The storage medium 130 stored in the storage medium slot can communicate with a system control unit 210 (see FIG. 2) of the digital camera 100. The storage medium 130 is not limited to a storage medium (e.g., a memory card) that can be inserted into or removed from the storage medium slot. The storage medium 130 can be an optical disk such as a digital versatile disc-rewriteable (DVD-RW) disk, and a magnetic disk such as hard disk. Moreover, the storage medium 130 can be built into a body of the digital camera 100.

Figure 2:
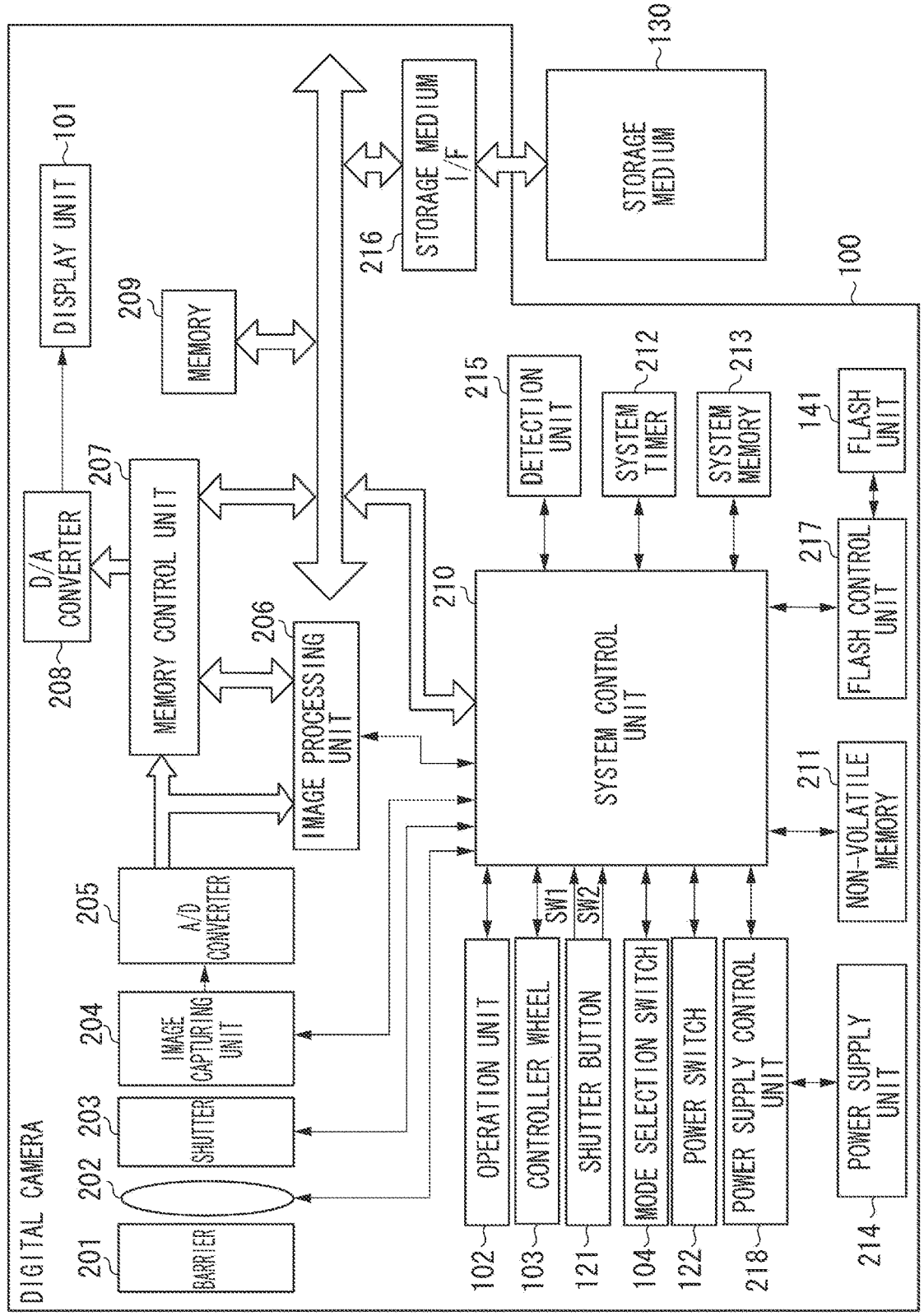
FIG. 2 is a diagram illustrating a hardware configuration of the digital camera.

FIG. 2 is a block diagram illustrating an example of a hardware configuration of the digital camera 100. The digital camera 100 includes a barrier 201, an imaging lens 202, a shutter 203, and an image capturing unit 204. The barrier 201 covers an image-capturing optical system to prevent the image-capturing optical system from being soiled or damaged. The imaging lens 202 configures the image-capturing optical system. The imaging lens 202 includes a lens group including a zoom lens and a focus lens. The shutter 203 has a diaphragm function to adjust an exposure amount with respect to the image capturing unit 204. The image capturing unit 204 as an image capturing element converts an optical image into an electric signal (an analog signal). The image capturing unit 204 is, for example, an image sensor such as a complementary metal-oxide-semiconductor (CMOS) sensor and a charge-coupled device (CCD) sensor with Bayer array structure in which red, green, and blue (RGB) pixels are regularly arranged. The shutter 203 can be a mechanical shutter or an electric shutter.

The digital camera 100 includes an analog-to-digital (A/D) converter 205, an image processing unit 206, a memory control unit 207, a digital-to-analog (D/A) converter 208, a memory 209, and the system control unit 210. An analog signal is output from the image capturing unit 204 to the A/D converter 205. The A/D converter 205 converts the analog signals into image data of digital signals, and outputs the image data to the image processing unit 206 or the memory control unit 207.

The image processing unit 206 performs processing with respect to the image data acquired from the A/D converter 205 or the data acquired from the memory control unit 207. The processing to be performed by the image processing unit 206 includes correction processing such as pixel interpolation and shading correction, white balance processing, gamma correction processing, and color conversion processing. Moreover, the image processing unit 206 performs processing such as cutout processing and variable magnification processing on an image to provide an electronic zoom function. Moreover, the image processing unit 206 performs predetermined calculation processing by using image data of a captured image. The system control unit 210 performs control such as exposure control and ranging control based on a result of the calculation processing performed by the image processing unit 206.

The image processing unit 206 includes an image combining processing circuit that generates a panoramic image from a plurality of images. The image combining processing circuit can perform not only simple additive combining processing and average combining processing, but also processing such as lighten composition processing and darken composition processing. In the lighten composition processing, a pixel having a lightest value in each area of combining target image data is selected, and image combining is performed to generate data of one image. In the darken composition processing, a pixel having a darkest value in each area of combining target image data is selected, and image combining is performed to generate data of one image. The image combining processing circuit can be configured as an image combining unit different from the image processing unit 206, or the system control unit 210 can have a function of the image combining processing circuit.

The image data to be output from the A/D converter 205 is written in the memory 209 via the image processing unit 206 and the memory control unit 207 or via the memory control unit 207. The memory 209 also serves as an image display memory (a video memory) in which image data to be displayed on the display unit 101 is stored. The memory 209 can also be used as a working area into which a program read from a non-volatile memory 211 by the system control unit 210 is loaded.

Image display data (digital data) stored in the memory 209 is transmitted to the D/A converter 208. The D/A converter 208 converts the received digital data into analog signals, and supplies the analog signals to the display unit 101. An image is thus displayed on the display unit 101. The display unit 101 displays the image based on the analog signals from the D/A converter 208. The display unit 101 is, for example, a display device, such as a liquid crystal display and an organic light emitting (EL) display. The digital camera 100 can have an electronic viewfinder function.

The digital camera 100 includes the non-volatile memory 211, a system timer 212, a system memory 213, a detection unit 215, and a flash control unit 217. The non-volatile memory 211 is a memory (e.g., an electrically erasable programmable read only memory (EEPROM)) where information such as a program and a constant can electrically deleted and stored. The non-volatile memory 211 stores, for example, a program to be executed by the system control unit 210 and a constant to be used for operation. Moreover, the non-volatile memory 211 includes an area in which system information is stored, and an area in which user setting information is stored. The system control unit 210 reads various information and setting stored in the non-volatile memory 211 to return to the stored setting for activation of the digital camera 100.

The system control unit 210 includes a central processing unit (CPU). The system control unit 210 executes various program codes stored in the non-volatile memory 211 to comprehensively control operations of the digital camera 100. The system control unit 210 reads a program, an operation constant, and a variable from the non-volatile memory 211, and such program, constant, and variable are loaded into the system memory 213. As for the system memory 213, a random access memory (RAM) is used. Moreover, the system control unit 210 controls, for example, the memory 209, the D/A converter 208, and the display unit 101 to perform display control.

The system timer 212 measures time to be used for various control and time of a clock installed in the digital camera 100. The flash control unit 217 controls a flash of the flash unit 141 according to brightness of a subject. The detection unit 215 includes a sensor, such as a gyroscope sensor. The detection unit 215 acquires information, such as angular speed information and orientation information of the digital camera 100. The angular speed information includes information of angular speed and angular acceleration of the digital camera 100 for image capturing during panning. Moreover, the orientation information includes information, such as inclination of the digital camera 100 with respect to a horizontal direction. In the present exemplary embodiment, each of the angular speed and the angular acceleration of the digital camera 100 for image capturing during panning is an example of a physical quantity indicating motion of an image capturing unit. Moreover, for example, inclination of the digital camera 100 with respect to a horizontal direction is an example of a physical quantity indicating orientation of the image capturing unit.

The shutter button 121 includes a first switch SW1 and a second switch SW2. The first switch SW1 is turned on in a half-pressed state in which the shutter button 121 is operated halfway. A signal for image capturing preparation instruction is thus transmitted to the system control unit 210. Upon receipt of the signal indicating that the first switch SW1 has been turned on, the system control unit 210 starts operations, such as automatic focus (AF) processing, automatic exposure (AE) processing, automatic white balance (AWB) processing, and electronic flash pre-emission (EF) processing. The second switch SW2 is turned on in a fully pressed state in which the operation of the shutter button 121 is completed. A signal for image capturing start instruction is thus transmitted to the system control unit 210. Upon receipt of the signal indicating that the second switch SW2 has been turned on, the system control unit 210 performs a series of image capturing operations from reading of a signal from the image capturing unit 204 to writing of image data into the storage medium 130.

The digital camera 100 includes a power supply unit 214 and a power supply control unit 218. The power supply unit 214 is for example, a primary battery, a secondary battery, and an alternating current (AC) adaptor. The power supply unit 214 supplies electric power to the power supply control unit 218. The power supply control unit 218 supplies the electric power output from the power supply unit 214 to each of units including the storage medium 130.

The digital camera 100 includes a storage medium interface (I/F) 216. The storage medium I/F 216 is an interface that enables the storage medium 130 and the system control unit 210 to be communicated.

Next, a description will be given of an example of a method for image capturing during panning and an example of a method for generating a panoramic image by combining a plurality of captured images. First, a description is given of an example of processing in which a predetermined area is cut out from image data of a captured image to generate a panoramic image.

Figure 3A:
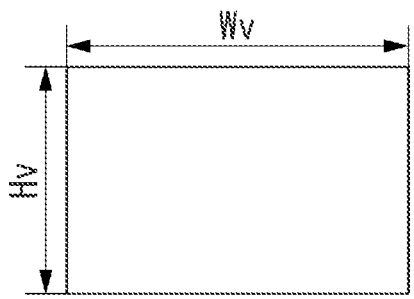
FIGS. 3A to 3D are diagrams each illustrating a relation between a panning direction and a cutout area of image data.
Figure 3B:
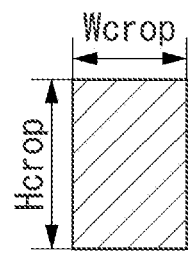

FIGS. 3A through 3D are diagrams illustrating an example of a relation between a direction in which the digital camera 100 is panned and a cutout area that is cut out from image data. FIG. 3A is a diagram illustrating an example of an effective image area of an image capturing element (an image sensor) included in the image capturing unit 204. The diagram illustrated in FIG. 3A includes the number of effective pixels Wv in a horizontal direction and the number of effective pixels Hv in a vertical direction. FIG. 3B is a diagram illustrating an example of a cutout area that is cut out from image data of a captured image. The diagram illustrated in FIG. 3B includes the number of cutout pixels Wcrop in a horizontal direction and the number of cutout pixels Hcrop in a vertical direction.

Figure 3C:
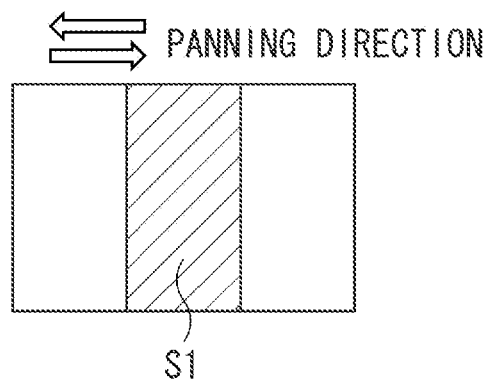

FIG. 3C is a diagram illustrating an example of a cutout area with respect to image data when an image is captured during panning of the digital camera 100 in a horizontal direction indicated by an arrow. In FIG. 3C, a cutout area S1 represents the cutout area from the image data. The number of cutout pixels Wcrop in a horizontal direction of the cutout area S1 is less than the number of effective pixels Wv in a horizontal direction (Wv>Wcrop). The number of cutout pixels Hcrop in the vertical direction of the cutout area S1 is equal to the number of effective pixels Hv in the vertical direction (Hv=Hcrop).

Figure 3D:
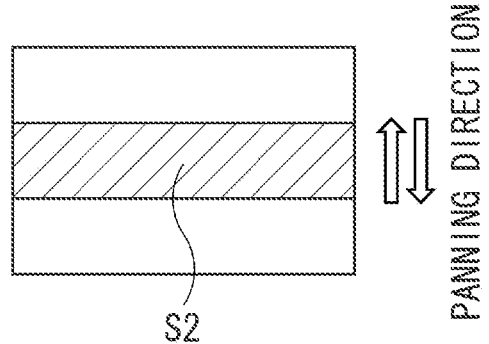

FIG. 3D is a diagram illustrating an example of a cutout area with respect to image data when an image is captured during panning of the digital camera 100 in a perpendicular direction indicated by an arrow. In FIG. 3D, a cutout area S2 represents the cutout area of the image data. The number of cutout pixels Wcrop in a horizontal direction of the cutout area S2 is equal to the number of effective pixels Wv in a horizontal direction (Wv=Wcrop). The number of cutout pixels Hcrop in a vertical direction of the cutout area S2 is less than the number of effective pixels Hv in a vertical direction (Hv>Hcrop).

A cutout area of image data of a captured image can differ for each image data. Moreover, as for image data at the beginning of panning and image data at the end of panning, a cutout area can be widened to widen an angle of view. A cutout area of image data can be determined, for example, according to a difference between an angle of the digital camera 100 immediately after image capturing and an angle of the digital camera 100 in one preceding frame. Only the image data necessary for combining processing for a panoramic image is stored, so that a storage capacity of the memory 209 can be saved.

Next, an example of a panoramic image generation method is described.

The system control unit 210 reads the image data which has been cut out and stored in the memory 209 for image capturing during panning, and detects misalignment of images corresponding to the image data read from the memory 209. For example, the system control unit 210 can detect misalignment as follows. First, the system control unit 210 divides each of cutout areas into alignment small blocks having an optional size. Subsequently, the system control unit 210 derives a sum of absolute difference (SAD) of brightness for each alignment small block with regard to two cutout areas in combining target image data. Then, the system control unit 210 derives an alignment small block having the smallest SAD as a corresponding point to calculate a motion vector. The motion vector can be calculated using information, such as angular speed information and orientation information detected by the detection unit 215. Subsequently, the system control unit 210 corrects misalignment of images of the two cutout areas based on the determined motion vector between the images of the two cutout areas in the combining target image data, and combines overlapped portions of the images of the two cutout areas by using, for example, weighted addition.

Figure 4:
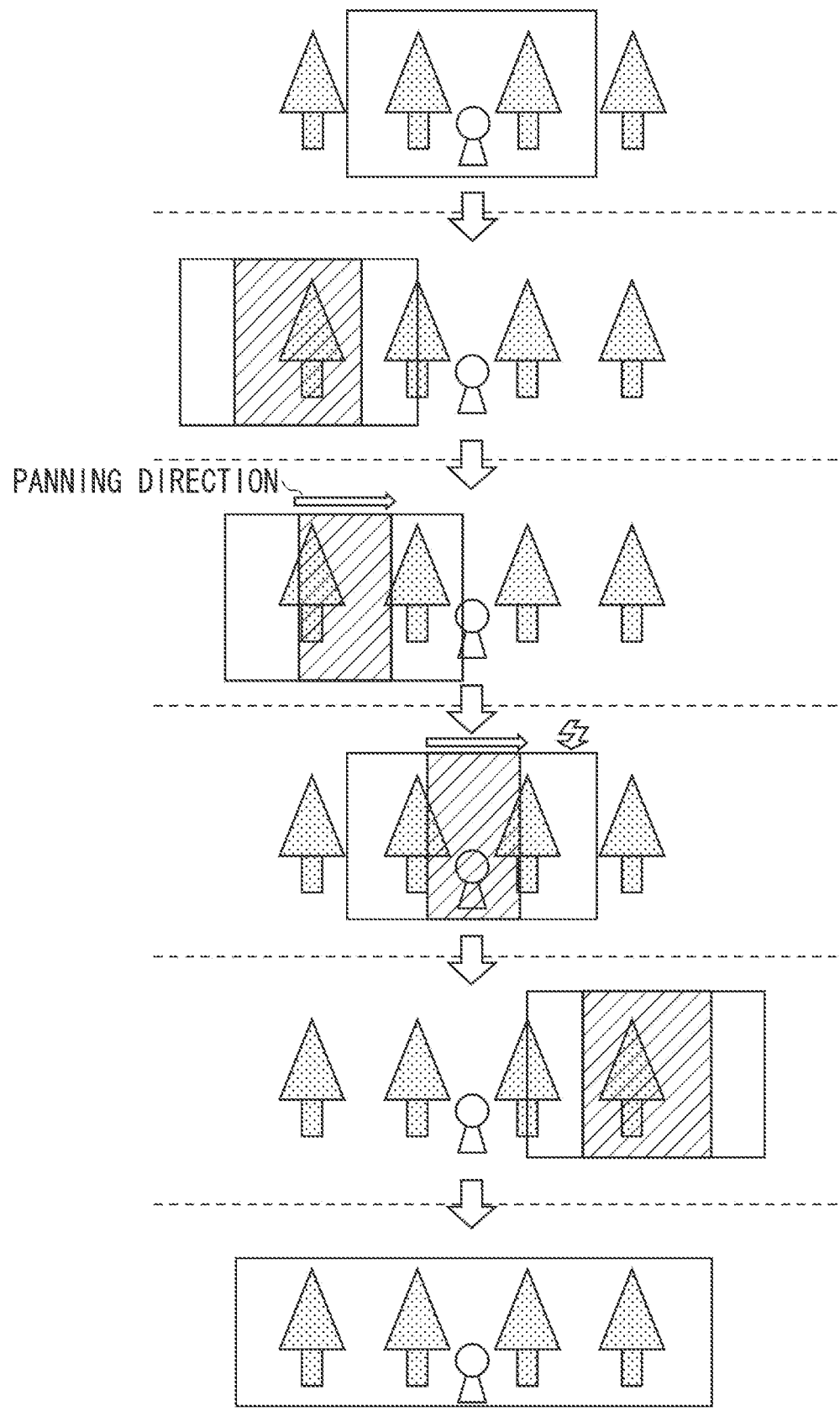
FIG. 4 is a diagram illustrating a correspondence relationship between combining processing for a panoramic image and image data.

FIG. 4 is a diagram illustrating an example of correspondence between combining processing for a panoramic image and image data. In FIG. 4, each area hatched with dotted lines represents an area in which a row of trees in an image sensing field is schematically illustrated. In FIG. 4, an area hatched with slant lines represents a cutout area of image data. The top portion of FIG. 4 illustrates a state in which the first switch SW1 of the shutter button 121 is turned on, and a user is making focus adjustment in a substantially middle portion of a panoramic image to be generated. A second portion from the top of FIG. 2 illustrates a state in which the second switch SW2 of the shutter button 121 is turned on, and an image capturing target field is set in one end of the panoramic image.

A third portion from the top of FIG. 4 illustrates a state in which continuous image capturing is performed under a first image capturing condition while the digital camera 100 is being panned toward the other end of the panoramic image. A fourth portion from the top of FIG. 4 schematically illustrates a state in which image capturing is performed under a second image capturing condition (e.g., an image capturing condition under which the flash unit 141 emits a flash) while the digital camera 100 is being panned. A fifth portion from the top of FIG. 4 indicates a state in which the digital camera 100 has been panned up to a set angle and the continuous image capturing has been finished. The bottom portion of FIG. 4 illustrates a panoramic image generated by combining a plurality of captured images (still images). In the example as illustrated in FIG. 4, the images respectively indicated by rectangles in the second to fifth portions from the top of FIG. 4 are continuously captured, and these images are combined to generate the panoramic image illustrated in the bottom of FIG. 4.

Figure 5A:
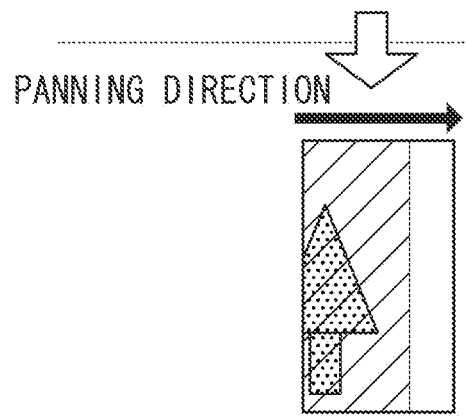
FIGS. 5A to 5C are diagrams illustrating a first example of a method for detecting misalignment in a panoramic image.
Figure 5B:
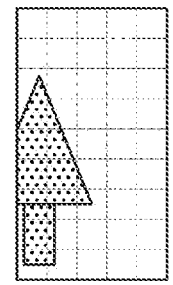
Figure 5C:
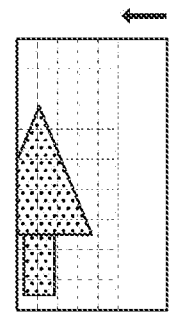

Next, an example of a method for detecting misalignment in a panoramic image is described with reference to FIGS. 5A through 5C. FIG. 5A is a diagram illustrating an example of an overlap relation between cutout areas from image data of when panoramic image capturing is performed while the digital camera 100 is being panned in a horizontal direction. In FIG. 5A, an area hatched with slant lines indicates an overlapped area that is common to two combining target images. Each of FIGS. 5B and 5C illustrates an example of alignment small blocks that are set when misalignment of an image illustrated in a lower portion of FIG. 5A with respect to an image illustrated in an upper portion of FIG. 5A is detected. In each of FIGS. 5B and 5C, an area hatched with dotted lines represents the alignment small blocks.

In alignment processing, an image is divided into alignment small blocks having an optional size as illustrated in FIG. 5B, and a motion vector is calculated for each alignment small block. As for the panoramic image capturing, in temporal continuous images as illustrated in the upper portion and the lower portion of FIG. 5A, an angle of view in at least one of a horizontal direction and a vertical direction is misaligned. Accordingly, as illustrated in FIG. 5B, even if alignment small blocks are set in an area that is not hatched with slant lines in the lower portion of FIG. 5A, a motion vector cannot be detected using such alignment small blocks. Thus, such setting of the alignment small blocks is useless. In the present exemplary embodiment, the system control unit 210 uses angular speed information and orientation information acquired by the detection unit 215 to derive a non-overlapped area in which two combining target images do not overlap. Then, the system control unit 210, as illustrated in FIG. 5C, sets alignment small blocks in only an overlapped area in which two combining target images overlap.

Accordingly, the alignment small blocks are set, so that a motion vector is not detected in an area in which detection of motion vector is not necessary. Herein, the system control unit 210 can perform setting such that the number of alignment small blocks is not changed. Such setting increases density of the alignment small blocks as illustrated in FIG. 5C, and thus an edge is detected more easily. Hence, the detection accuracy of the misalignment is enhanced. In the present exemplary embodiment, for example, a plurality of alignment small blocks is an example of a plurality of blocks, and a motion vector is an example of information to be used for alignment.

Figure 6:
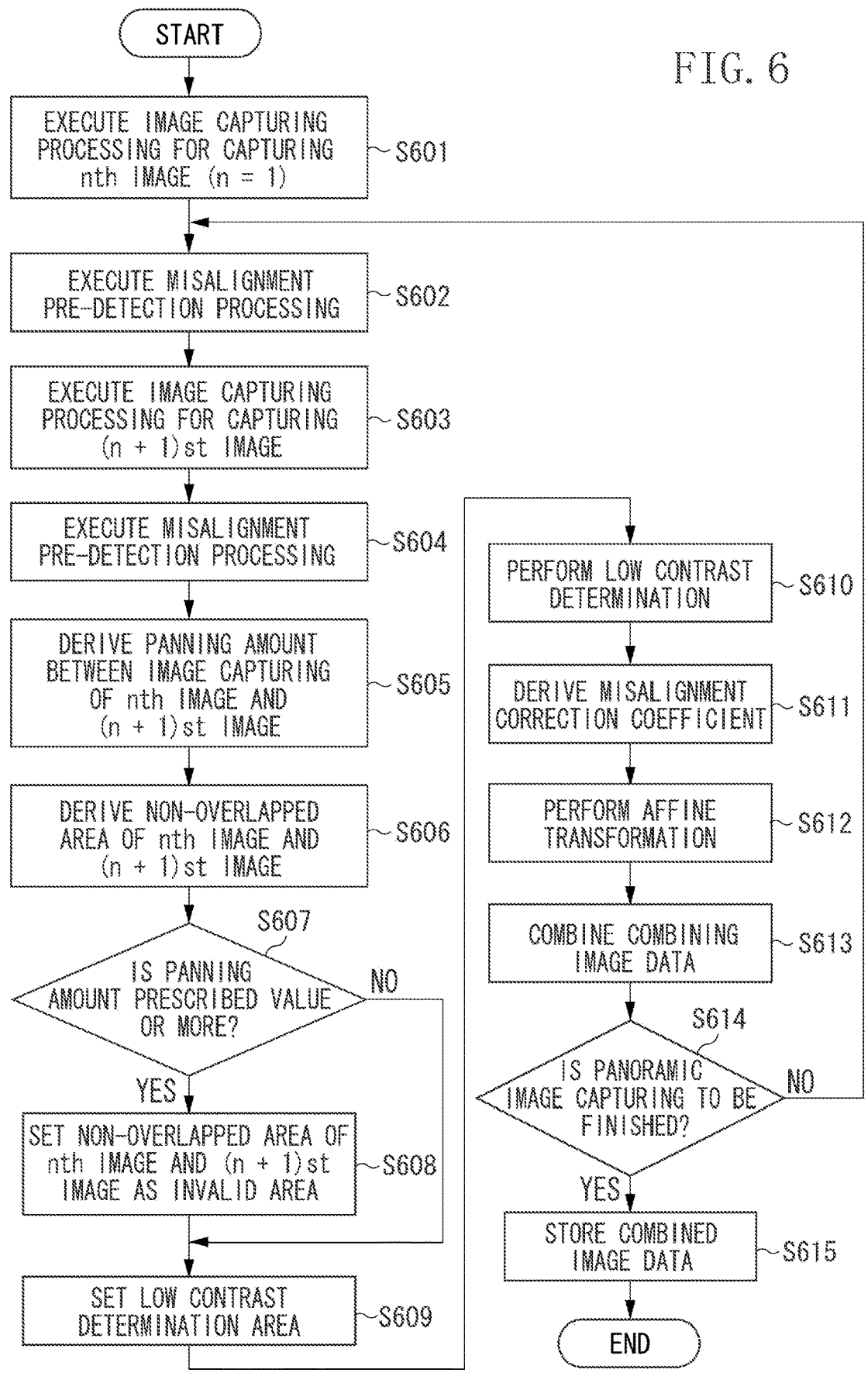
FIG. 6 is a flowchart illustrating a first example of processing performed by the digital camera.

FIG. 6 is a flowchart illustrating an example of processing performed by the digital camera 100 when panoramic image capturing is performed. The combining processing for a panoramic image of the flowchart illustrated in FIG. 6 is executed, for example, in a case where a user selects a panoramic image generation combining mode by using the mode selection switch 104. The system control unit 210, for example, loads a predetermined program read from the non-volatile memory 211 to the system memory 213, and controls processing and operation of each unit of the digital camera 100 to execute each step of the processing in FIG. 6.

If the second switch SW2 is turned on, the processing proceeds to step S601. In step S601, the system control unit 210 controls each unit of the digital camera 100 to execute image capturing processing for capturing an nth image (to capture one image). Subsequently, in step S602, the system control unit 210 uses the image processing unit 206 to perform misalignment pre-detection processing. That is, the system control unit 210 uses the image processing unit 206 to cut out image data in a strip shape according to a panning direction to generate combining image data. Herein, the image data to be cut out is data of an image captured under an image capturing condition defined prior to the image capturing. Then, the system control unit 210 makes a correction, such as a distortion correction and a cylindrical conversion correction with respect to the combining image data to generate a reduced image for misalignment detection.

Subsequently, when the second switch SW2 is turned on again, the processing proceeds to step S603. In step S603, the system control unit 210 controls each unit of the digital camera 100 to execute image capturing processing for capturing an (n+1)st image (to capture one image). A user may designate continuous image capturing with the second switch SW2 pressed. In such a case, the system control unit 210 can concurrently perform the image capturing processing for capturing an (n+1)st image in step S603 and the misalignment pre-detection processing in step S602. Alternatively, the system control unit 210 can perform control such that the second switch SW2 cannot be turned on to capture an (n+1)st image in step S603 until completion of the misalignment pre-detection processing in step S602. In the present exemplary embodiment, an nth image is an example of a first captured image, and an (n+1)st image is an example of a second captured image.

Next, in step S604, the system control unit 210 uses the image processing unit 206 to perform misalignment pre-detection processing with respect to the image data of the (n+1)st image as similar to the processing in step S602.

In step S605, the system control unit 210 acquires angular speed information of the digital camera 100 detected by the detection unit 215. Further, the system control unit 210 acquires an elapsed time between the image capturing of the nth image and the (n+1)st image based on the time measured by the system timer 212. The system control unit 210 uses the angular speed information and the elapsed time to derive an amount by which the digital camera 100 is panned between the image capturing of the nth image and the (n+1)st image. Alternatively, the system control unit 210 can continuously acquire angular speed information and an elapsed time at a predetermined time interval between image capturing of an nth image and an (n+1)st image, instead of the time of image capturing of the (n+1)st image. In such a case, the system control unit 210 can calculate an amount through which the digital camera 100 is panned between the image capturing of the nth image and the (n+1)st image from a value of integral based on the angular speed information and the elapsed time continuously acquired at the predetermined interval. In the present exemplary embodiment, an amount by which the digital camera 100 is panned between image capturing of an nth image and an (n+1)st image is an example of a motion amount of the image capturing unit.

Subsequently, in step S606, the system control unit 210 uses the panning amount acquired in step S605 to derive a non-overlapped area in which combining image data of the nth image and the (n+1)st image do not overlap. In step S607, the system control unit 210 determines whether the panning amount acquired in step S605 is a prescribed value (a threshold) or more. In a case where the system control unit 210 determines that the panning amount acquired in step S605 is not a prescribed value or more (NO in step S607), the processing proceeds to step S609 without execution of step S608 that will be described below. On the other hand, In a case where the system control unit 210 determines that the panning amount acquired in step S605 is a prescribed value or more (YES in step S607), the processing proceeds to step S608. In step S608, the system control unit 210 sets the non-overlapped area derived in step S606 as an invalid area that is not used for detection of misalignment of the combining image data of the nth image and the (n+1)st image. In the present exemplary embodiment, an invalid area is an example of a non-use area.

As for the misalignment detection, low contrast determination needs to be performed beforehand with respect to image data. Accordingly, in step S609, the system control unit 210 uses the image processing unit 206 to set a low contrast determination area for detection of misalignment. That is, the system control unit 210 sets the overlapped area of the combining image data of the nth image and the (n+1)st image excluding the invalid area set in step S608 as a low contrast determination area for detection of misalignment in the image data of the (n+1)st image. In a case where the system control unit 210 determines that the panning amount acquired in step S605 is not a prescribed value or more (NO in step S607), the processing proceeds to step S608. Then, in step S608, the system control unit 210 uses the image processing unit 206 to set an area of all the pixels of the combining image data of the (n+1)st image as a low contrast determination area for detection of misalignment.

Herein, processing time for derivation of a motion vector depends on size of a low contrast determination area. Moreover, in a case where processing speed of the image processing unit 206 is low, or in a case where the memory 209 does not have enough size, the number of images acquirable by continuous image capturing is reduced. In such a case, processing time for derivation of a motion vector needs to be reduced so that the adequate number of images acquirable by continuous image capturing is obtained. Accordingly, the system control unit 210 can set an area having a predetermined size and allowing the adequate number of images acquirable by continuous image capturing to be obtained as a low contrast determination area instead of the area of all the pixels of the combining target image data. The area having a predetermined size is determined according to, for example, performance of the memory 209 or the image processing unit 206. In the present exemplary embodiment, an area such as an area of all the pixels of combining image data of an (n+1)st image and a predetermined-size area of combining image data of an (n+1)st image are examples of misalignment detection areas.

Alternatively, in step S607, the system control unit 210 can determine whether a non-overlapped area is set as an invalid area according to size of the non-overlapped area derived in step S606, instead of the panning amount derived in step S605. Moreover, the angular speed information to be acquired in step S605 and the non-overlapped area to be derived in step S606 can be limited to a horizontal direction or a vertical direction (of the digital camera 100). Both of the horizontal direction and the vertical direction can also be considered. If a non-overlapped area is limited to the horizontal direction, the non-overlapped area is derived based on, for example, a horizontal component of angular speed. If a non-overlapped area is limited to the vertical direction, the non-overlapped area is derived based on, for example, a vertical component of angular speed. In the present exemplary embodiment, an area in at least one of a horizontal direction and a vertical direction (of the digital camera 100) is set as a non-overlapped area (an invalid area), so that an area in at least one of the horizontal direction and the vertical direction of an image capturing unit serves as an example of a non-use area.

Next, in step S610, the system control unit 210 uses the image processing unit 206 to perform low contrast determination in the low contrast determination area set in step S609. For example, the system control unit 210 detects an edge from the low contrast determination area set in step S609, and determines that an area in which an edge is not detected is a low contrast area.

In step S611, the system control unit 210 uses the image processing unit 206 to derive a motion vector with respect to the area which is not determined as a low contrast area in step S609. That is, the system control unit 210 uses the image processing unit 206 to derive a motion vector from only the area in which an edge has been detected. Then, the system control unit 210 uses such a motion vector to derive a misalignment correction coefficient for correction of misalignment of the image data of the (n+1)st image with respect to the image data of the nth image.

In step S612, the system control unit 210 uses the misalignment correction coefficient derived in step S611 to perform affine transformation with respect to the combining image data of the (n+1)st image. In step S613, the system control unit 210 uses the image processing unit 206 to combine the combining image data of the nth image and the (n+1)st image, thereby generating combined image data of one image. In step S614, the system control unit 210 determines whether to finish the panoramic image capturing based on the number of image capturing operations and a size of the combined image data generated in step S613. In a case where the system control unit 210 determines that panoramic image capturing is not to be finished (NO in step S614), the processing returns to step S602. In step S602, the system control unit 210 uses the image processing unit 206 to perform misalignment pre-detection processing with respect to the combined image data generated in step S613, and then repeats the processing in steps S603 through S614 by using the combined image data generated in step S613 as combining image data of an nth image. In a case where the system control unit 210 determines that the panoramic image capturing is to be finished (YES in step S614), the processing proceeds to step S615. In step S615, the system control unit 210 stores the generated combined image data in the storage medium 130, and the panoramic image capturing ends.

According to the present exemplary embodiment, therefore, the system control unit 210 uses angular speed information and orientation information of the digital camera 100 to set a non-overlapped area in which an nth image and an (n+1)st image do not overlap as an invalid area that is not used for detection of misalignment of the (n+1)st image. Then, the system control unit 210 sets alignment small blocks for a motion vector search in only an overlapped area (an area excluding the invalid area) in which two combining target images overlap. Therefore, the detection accuracy of the misalignment of the two combining target images can be enhanced without excess processing load (processing time). Hence, quality of a panoramic image can be enhanced without excess processing load (processing time).

In a case where misalignment of two images is to be detected, alignment small blocks may be finely set. In general, such fine setting increases density of the alignment small blocks, and thus the detection accuracy of the misalignment is enhanced. However, the smaller the alignment small block, the higher the number of calculations. This increases an amount of time necessary for detection of misalignment. In the present exemplary embodiment, on the other hand, the system control unit 210 performs setting such that the number of alignment small blocks to be set only within an overlapped area in which two combining target images overlap is substantially equal to the number of alignment small blocks to be set in an area of all the pixels of two combining target images. Therefore, an increase in a time necessary for detection of misalignment can be suppressed, even if density of the alignment small blocks to be set only in the overlapped area in which the two combining target images overlap is increased. Hence, the detection accuracy of the misalignment of the two combining target images can be further enhanced without excess processing load (processing time).

Next, a second exemplary embodiment is described. The first exemplary embodiment has been described using an example case in which a non-overlapped area in which an nth image and an (n+1)st image do not overlap is set as an invalid area that is not used for detection of misalignment of the (n+1)st image. The second exemplary embodiment is described using an example in which a low contrast area of an (n+1)st image is set as an invalid area that is not used for detection of misalignment of an nth image and the (n+1)st image. Thus, the present exemplary embodiment and the first exemplary embodiment mainly differ in one portion of processing performed at misalignment detection. In the description of the present exemplary embodiment, portions substantially the same as those of the first exemplary embodiment are given the same reference numerals as those in FIGS. 1 through 6, and detailed descriptions thereof are omitted.

FIGS. 7A through 7C are diagrams illustrating an example of a method for detecting misalignment of a panoramic image. FIG. 7A illustrates an example of an overlap relation between cutout areas from image data in a case where panoramic image capturing is performed while a digital camera 100 is being panned in a horizontal direction. In FIG. 7A, an area hatched with slant lines indicates an overlapped area that is common to two combining target images. Each of FIGS. 7B and 7C illustrates an example of alignment small blocks that are set when misalignment of an image illustrated in a lower portion of FIG. 7A with respect to an image illustrated in an upper portion of FIG. 7A is to be detected. In each of FIGS. 7B and 7C, an area hatched with dotted lines represents the alignment small blocks.

In alignment processing, an image is divided into alignment small blocks having an optional size as illustrated in FIG. 7B, and a motion vector is calculated for each alignment small block. Assume that the area hatched with lattice lines in FIG. 7A has low contrast. In this case, even if alignment small blocks are set in such an area hatched with lattice lines, a motion vector cannot be detected using such the alignment small blocks. Thus, such setting of the alignment small blocks is useless. Accordingly, a system control unit 210 uses an image processing unit 206 to perform low contrast determination with respect to an area that is cut out from image data, and sets alignment small blocks as illustrated in FIG. 7 in only an area excluding an area determined as a low contrast area.

Accordingly, the alignment small blocks are set, so that a motion vector is not detected in an area in which detection of motion vector is not necessary. Herein, the system control unit 210 can perform setting such that the number of alignment small blocks is not changed. Since such setting increases density of the alignment small blocks as illustrated in FIG. 7C, an edge is detected more easily. Hence, the detection accuracy of the misalignment is enhanced. In the present exemplary embodiment, for example, a plurality of alignment small blocks is an example of a plurality of blocks, and a motion vector is an example of information to be used for alignment.

Figure 8:
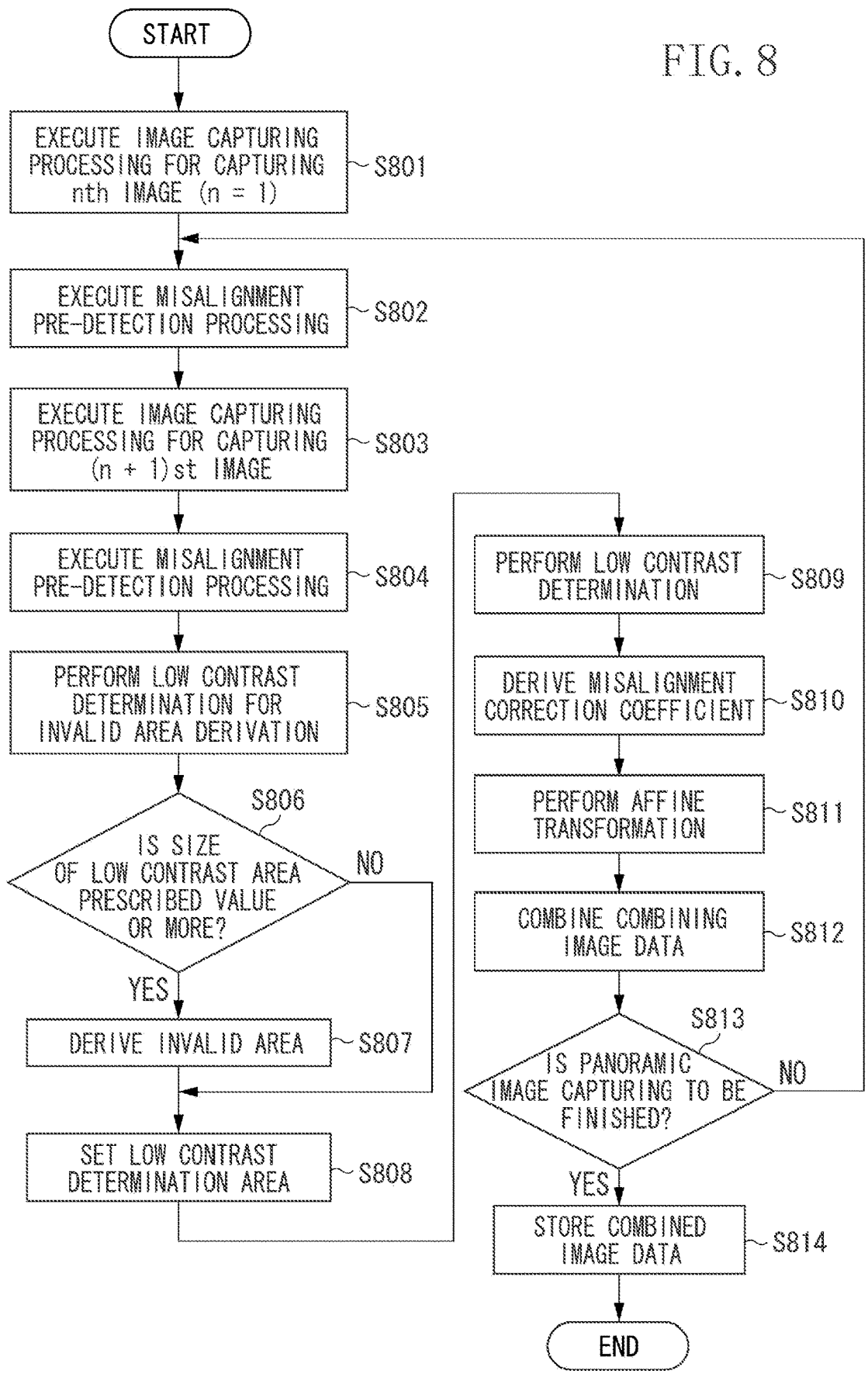
FIG. 8 is a flowchart illustrating a second example of processing performed by the digital camera.

FIG. 8 is a flowchart illustrating an example of processing performed by the digital camera 100 when panoramic image capturing is performed. The combining processing for a panoramic image of the flowchart illustrated in FIG. 8 is executed, for example, in a case where a user selects a panoramic image combining mode by using a mode selection switch 104. The system control unit 210, for example, loads a predetermined program read from a non-volatile memory 211 to a system memory 213, and controls processing and operation of each unit of the digital camera 100 to execute each step of the processing in FIG. 8.

When a second switch SW2 is turned on, the processing proceeds to step S801. In step S801, the system control unit 210 controls each unit of the digital camera 100 to execute image capturing processing for capturing an nth image (to capture one image). Subsequently, in step S802, the system control unit 210 uses the image processing unit 206 to perform misalignment pre-detection processing. That is, the system control unit 210 uses the image processing unit 206 to cut out image data in a strip shape according to a panning direction to generate combining image data. Herein, the image data to be cut out is data of an image captured under an image capturing condition defined prior to the image capturing. Then, the system control unit 210 makes a correction, such as a distortion correction and a cylindrical conversion correction with respect to the combining image data to generate a reduced image for misalignment detection.

Subsequently, when the second switch SW2 is turned on again, the processing proceeds to step S803. In step S803, the system control unit 210 controls each unit of the digital camera 100 to execute image capturing processing for capturing an (n+1)st image (to capture one image). A user may designate continuous image capturing with the second switch SW2 pressed. In such a case, the system control unit 210 can concurrently perform the image capturing processing for capturing an (n+1)st image in step S803 and the misalignment pre-detection processing in step S802. Alternatively, the system control unit 210 can perform control such that the second switch SW2 cannot be turned on to capture an (n+1)st image in step S803 until completion of the misalignment pre-detection processing in step S802. In the present exemplary embodiment, an nth image is one example of a first captured image, and an (n+1)st image is an example of a second captured image.

Next, in step S804, the system control unit 210 uses the image processing unit 206 to perform misalignment pre-detection processing with respect to the image data of the (n+1)st image as similar to the processing in step S802.

In step S805, the system control unit 210 uses the image processing unit 206 to perform low contrast determination for invalid area derivation with respect to the entire combining image data of the (n+1)st image. For example, the system control unit 210 detects an edge from an area of the entire combining image data of the (n+1)st image, and determines that an area in which an edge is not detected is a low contrast area.

Next, in step S806, the system control unit 210 determines whether a size of the low contrast area determined in step S805 is a prescribed value (a threshold) or more. The prescribed value is, for example, a predetermined size of an area according to performance of a memory 209 and the image processing unit 206. In a case where the system control unit 210 determines that a size of the low contrast area determined in step S805 is not a prescribed value or more (NO in step S806), the processing proceeds to step S808 without execution of step S807 that will be described below. On the other hand, in a case where the system control unit 210 determines that a size of the low contrast area determined in S805 is a prescribed value or more (YES in step S806), the processing proceeds to step S807. In step S807, the system control unit 210 derives such a low contrast area as an invalid area that is not used for detection of misalignment of the combining image data of the nth image and the (n+1)st image. In the present exemplary embodiment, an invalid area is an example of a non-use area that is defined based on contrast.

In step S808, the system control unit 210 uses the image processing unit 206 to set a low contrast determination area for detection of misalignment. That is, the system control unit 210 sets an area that excludes the invalid area derived in step S807 from a predetermined-size area of the combining image data of the (n+1)st image as a low contrast determination area for detection of misalignment in the combining image data of the (n+1)st image. In a case where the system control unit 210 determines that a size of the low contrast area determined in step S805 is not a prescribed value or more (NO in step S806), the processing proceeds to step S808. In step S808, the system control unit 210 sets a predetermined-size area as a low contrast determination area for detection of misalignment in the combining image data of the (n+1)st image. Herein, the predetermined-size area is, for example, defined according to performance of the memory 209 and the image processing unit 206. The system control unit 210 can use an area of all the pixels of the combining image data of the (n+1)st image instead of the predetermined-size area of the combining image data of the (n+1)st image. In the present exemplary embodiment, an area such as a predetermined-size area of combining image data of an (n+1)st image, and an area of all the pixels of combining image data of an (n+1)st image are examples of a misalignment detection areas.

Next, in step S809, the system control unit 210 uses the image processing unit 206 to perform low contrast determination for misalignment detection in the low contrast determination area set in step S808. For example, the system control unit 210 detects an edge from the low contrast area set in the step S808, and determines that an area in which an edge is not detected is a low contrast area.

In step S810, the system control unit 210 uses the image processing unit 206 to derive a motion vector with respect to the area which is not determined as a low contrast area in step S809. Then, the system control unit 210 uses such a motion vector to derive a misalignment correction coefficient for correction of misalignment of the image data of the (n+1)st image with respect to the image data of the nth image.

Subsequently, in step S811, the system control unit 210 uses the misalignment correction coefficient derived in step S810 to perform affine transformation with respect to the combining image data of the (n+1)st image. In step S812, the system control unit 210 uses the image processing unit 206 to combine the combining image data of the nth image and the (n+1)st image, thereby generating combined image data of one image. In step S813, the system control unit 210 determines whether to finish the panoramic image capturing based on the number of image capturing operations and a size of the combined image data generated in step S812. In a case where the system control unit 210 determines that the panoramic image capturing is not to be finished (NO in step S813), the processing returns to step S802. In step S802, the system control unit 210 uses the image processing unit 206 to perform misalignment pre-detection processing with respect to the combined image data generated in step S812, and then repeats the processing in steps S803 to S813 by using the combined image data generated in step S812 as combining image data of an nth image. In a case where the system control unit 210 determines that the panoramic image capturing is to be finished (YES in step S813), the processing proceeds to step S814. In step S814, the system control unit 210 stores the generated combined image data in a storage medium 130, and the panoramic image capturing ends.

According to the present exemplary embodiment, therefore, the system control unit 210 sets a low contrast area as an invalid area that is not used for detection of image misalignment. The system control unit 210 sets alignment small blocks for a motion vector search in only an area excluding the invalid area within an overlapped area in which two combining target images overlap. In the present exemplary embodiment, therefore, an effect substantially the same as that described in the first exemplary embodiment can be provided. As similar to the first exemplary embodiment, density of the alignment small blocks can be increased. In a case where a size of a low contrast area determined in step S805 is not a prescribed value or more, an area to be used for low contrast determination for invalid area derivation in step S805 can be set to substantially the same as a low contrast determination area to be set in step S808. In such a case, if a size of a low contrast area determined in step S805 is not a prescribed value or more in step S806, the processing in steps S808 and S809 can be omitted.

Next, a third exemplary embodiment is described. The first exemplary embodiment has been described using an example case in which a non-overlapped area in which an nth image and an (n+1)st image do not overlap is set as an invalid area that is not used for detection of misalignment of the (n+1)st image. The second exemplary embodiment has been described using an example case in which a low contrast area of an (n+1)st image is set as an invalid area that is not used for detection of misalignment of an nth image and the (n+1)st image. The present exemplary embodiment is described using an example case in which both of a non-overlapped area in which an nth image and an (n+1)st image do not overlap and a low contrast area of the (n+1)st image are set as invalid areas that are not used for detection of misalignment of the nth image and the (n+1)st image. Accordingly, the present exemplary embodiment is a combination of the first exemplary embodiment and the second exemplary embodiment. Thus, in the description of the present exemplary embodiment, portions substantially the same as those of the first exemplary embodiment and the second exemplary embodiment are given the same reference numerals as those in FIGS. 1 through 8, and detailed descriptions thereof are omitted.

First, a first example is described. The processing in steps S805 to S807 of the flowchart illustrated in FIG. 8 is incorporated between steps S608 and S609 and between NO in step 607 and step S609 of the flowchart illustrated in FIG. 6. In such a case, in a case where a system control unit 210 determines that a size of the low contrast area determined in step S805 is not a prescribed value of more (NO in incorporated step S806), the processing proceeds to step S609 illustrated in FIG. 6. Then, in step S609, the system control unit 210 uses the image processing unit 206 to set a low contrast determination area for misalignment detection. That is, the system control unit 210 sets an overlapped area of combining image data of an nth image and an (n+1)st image excluding the invalid area set in step S608 and the invalid area derived in step S807 as a low contrast determination are for misalignment detection with respect to the image data of the (n+1)st image.

Next, a second example is described. The processing in steps 605 to S607 of the flowchart illustrated in FIG. 6 is incorporated between steps S807 and S808 and between NO in step 806 and step S808 of the flowchart illustrated in FIG. 8. In such a case, in a case where the system control unit 210 determines that the panning amount acquired in step S605 is not a prescribed amount or more (NO in incorporated step S607), the processing proceeds to step S808 illustrated in FIG. 8. In step S808, the system control unit 210 uses the image processing unit 206 to set a low contrast determination area for misalignment detection. That is, the system control unit 210 sets an overlapped area of combining image data of an nth image and an (n+1)st image excluding the invalid area derived in step S608 and the invalid area set in step S807 as a low contrast determination area for misalignment detection with respect to the image data of the (n+1)st image.

As similar to the first and second exemplary embodiments, in the present exemplary embodiment, the number of alignment small blocks can be the same regardless of whether an invalid area is set.

According to the present exemplary embodiment, therefore, the system control unit 210 sets both of a non-overlapped area in which two combining target images do not overlap and a low contras area as invalid areas that are not used for detection of image misalignment. Then, the system control unit 210 sets alignment small blocks for a motion vector search in only an area excluding the invalid areas within the overlapped area in which two combining target images overlap. Hence, the detection accuracy of the misalignment in the two combining target image can be further enhanced while reducing a load of the processing for detecting the misalignment in the two combining target images.

While each of the exemplary embodiments has been described, it is to be understood that the present disclosure is intended to illustrate a specific example, and not intended to limit the technical scope of the exemplary embodiments. That is, various modifications and enhancement are possible without departing from the technical concept or main characteristics of each of the exemplary embodiments.

Aspects of the present invention can be achieved by processing in which a program for performing one or more functions of the above exemplary embodiments is supplied to a system or an apparatus via a network or a storage medium, and one or more processors in a computer of the system or apparatus reads and executes the program. Moreover, aspects of the present invention can be achieved by a circuit (e.g., application specific integrated circuit (ASIC)) for performing one or more functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-141099, filed Jul. 20, 2017, which is hereby incorporated by reference herein in its entirety.

What is claimed is:
1. An image processing apparatus, comprising:
at least one memory storing instructions; and
at least one processor connected to the at least one memory and configured to execute the instructions, which when executed by the at least one processor, cause the image processing apparatus to:
acquire a first captured image and a second captured image that is to be combined with the first captured image;
set a misalignment detection area in the second captured image, for detecting the misalignment between the first captured image and the second captured image, by excluding a non-use area in which the first captured image does not overlap with the second captured image;
divide the misalignment detection area into a same number of blocks in a first condition and a second condition; and align the first captured image and the second captured image based on information derived from the misalignment detection area;

wherein each of the blocks in the first condition is smaller than each of the blocks in the second condition.

2. The image processing apparatus according to claim 1, wherein the non-use area is based on a physical quantity indicating motion of an image sensor that captured the first captured image and the second captured image.

3. The image processing apparatus according to claim 2, wherein the instructions, when executed by the at least one processor, further cause the image processing apparatus to:
set an area in at least one of a horizontal direction and a vertical direction as the non-use area, based on a quantity in the direction of the physical quantity indicating motion of the image sensor.

4. The image processing apparatus according to claim 2, wherein the physical quantity includes angular speed of the image sensor.

5. The image processing apparatus according to claim 2, wherein the instructions, when executed by the at least one processor, further cause the image processing apparatus to:
set the non-use area based on the physical quantity indicating motion of the image sensor and a physical quantity indicating orientation of the image sensor.

6. The image processing apparatus according to claim 2, further comprising:
an accelerometer and/or a gyro,
wherein the accelerometer and/or gyro detects the physical quantity indicating motion of the image sensor.

7. The image processing apparatus according to claim 1, wherein the instructions, when executed by the at least one processor, further cause the image processing apparatus to:
reduce the misalignment detection area in a case where a size of the non-use area is a prescribed value or more.

8. The image processing apparatus according to claim 1, wherein the instructions, when executed by the at least one processor, further cause the image processing apparatus to:
acquire information for the alignment with respect to each block of the plurality of blocks to be set in the misalignment detection area; and
use the acquired information to perform alignment between the first captured image and the second captured image.

9. The image processing apparatus according to claim 1, wherein the instructions, when executed by the at least one processor, further cause the image processing apparatus to:
perform combining processing with respect to the first image and the second image subsequent to the alignment.

10. A control method for an image processing apparatus, the method comprising:
acquiring a first captured image and a second captured image that is to be combined with the first captured image;
setting a misalignment detection area in the second captured image for detecting the misalignment between the first captured image and the second captured image, by excluding a non-use area in which the first captured image does not overlap with the second captured image;
dividing the misalignment detection area into same number of blocks in a first condition and a second condition; and
aligning the first captured image and the second captured image based on information derived from the misalignment detection area,
wherein each of the blocks in the first condition is smaller than each of the blocks in the second condition.

11. A non-transitory storage medium storing instructions, which when executed by at least one processor, cause the at least one processor to:
acquire a first captured image and a second captured image that is to be combined with the first captured image;
set a misalignment detection area in the second captured image, for detecting the misalignment between the first captured image and the second captured image, by excluding a non-use area in which the first captured image does not overlap with the second captured image;
divide the misalignment detection area into a same number of blocks in a first condition and a second condition; and
align the first captured image and the second captured image based on information derived from the reduced misalignment detection area,
wherein each of the blocks in the first condition is smaller than each of the blocks in the second condition.

12. The image processing apparatus according to claim 1, wherein the instructions, when executed by the at least one processor, further cause the image processing apparatus to:
divide the misalignment detection area into a plurality of equally sized blocks.

* * * * *